Aug. 14, 1956     F. W. DOLLAR     2,758,866
RESILIENT BUMPER PROTECTOR COVER
Filed Oct. 16, 1952
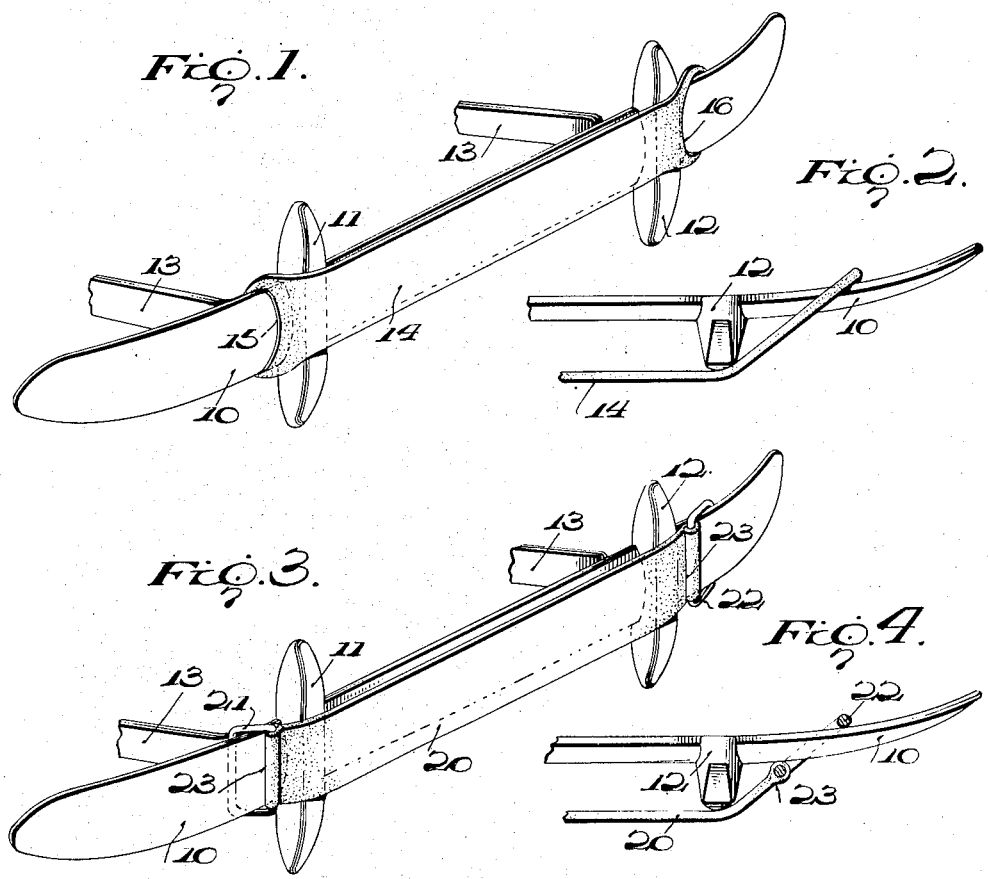
INVENTOR
Fred W. Dollar
BY
W. J. Eccleston
ATTORNEY

United States Patent Office 2,758,866
Patented Aug. 14, 1956

---

2,758,866

RESILIENT BUMPER PROTECTOR COVER

Fred W. Dollar, Henderson, Tex.

Application October 16, 1952, Serial No. 315,216

2 Claims. (Cl. 293—71)

(Granted under Title 35, U. S. Code (1952), sec. 266)

The invention described herein, if patented, may be manufactured and used by or for the Government for governmental purposes without the payment to me of any royalty thereon.

This invention relates to bumper protectors for automobiles, trucks and other road vehicles.

As is well known, nearly all motor vehicles in the United States are provided with bumpers or shock-absorbing fenders which are usually plated with brightly polished metal. These bumpers are easily scratched, causing the base metal (steel) to be exposed, which results in rusty scratches that mar the appearance of the bumpers. Also hard blows against objects presenting edges or corners will not infrequently dent or bend the bumpers, again detracting from their appearance.

Among other objects, the invention aims to provide attachments for bumpers which will obviate scratching and will usually prevent denting of the bumpers, making it possible for a car equipped with the attachments to push another car, or be pushed from the rear, without damage to its bumpers. Attachments embodying the invention will absorb some of the impact of a collision and may lessen the damage resulting therefrom.

A further object is to provide bumper attachments which may be applied and removed by hand, that is, either without tools or with implements of the simplest construction, and without change or modification of any part of the bumper.

Additional objects are to provide bumper attachments which are easily manufactured by automatic machinery, are relatively inexpensive, and may be of many different colors so as either to contrast with or blend with the bumpers.

This application is a companion to application Ser. No. 340,416 filed by me on March 4, 1953.

In the accompanying drawings showing two forms of the invention,

Fig. 1 is a perspective view of a bumper having a protector embodying the invention attached thereto;

Fig. 2 is a fragmentary plan view showing one end of the bumper and the protector;

Fig. 3 is a perspective view of a bumper showing another form of protector attached thereto;

Fig. 4 is a fragmentary plan view of the bumper and protector of Fig. 3.

Referring first to Figs. 1 and 2, the bumper bar 10 has bolted thereto the usual pair of bumper guards 11, 12 which extend vertically above and below the general plane of the bumper to protect the car or truck against blows from other cars or objects. The brackets 13 for securing the bumper bar to the chassis or body of the car or truck are not fully shown as they have no bearing on the invention.

Secured to the bumper so as to substantially cover the outer face of the bumper between the bumper guards and thus form a cushioning and protecting layer is a bumper protector 14 made preferably of resilient rubber or rubber-like material, capable of being stretched about 40% of its normal length. The protector 14 has apertures 15, 16 at opposite ends and said apertures are large enough so that the protector may be slipped over the free ends of the bumper. The assembling of the protector on the bumper is of course accomplished one end at a time, that is, one aperture is engaged with the bumper end while the other end of the protector is entirely free of the bumper. Then the engaged end of the protector is slid along the bumper guard, the protector is streched lengthwise, and the aperture at the opposite end is engaged with the bumper. The tension of the protector causes it to contract to the position of Fig. 1, wherein it is secured firmly in front of but is spaced from the bumper bar, and affords protection to the bumper guards as well as the bumper itself. Usually no tools will be needed to install or remove the protector; however, some persons will find it convenient to use a flat bar or similar implement to give the desired leverage to hold the stretched protector as its end is slipped over the end of the bumper.

Referring to Figs. 3 and 4, the bumper bar 10 is shown carrying a protector 20 which is like protector 14 in every respect except that it has swingably mounted metal rings or loops 21, 22 at its ends instead of apertures. Such metal loops should be of rust-proofed metal and preferably are square or oblong, with rounded corners, being permanently secured to the ends of the protector by seams 23, which may be vulcanized. The metal loops are free to turn in their seams and are large enough so that they may be easily slipped over the ends of the bumper bar; hence this form of the invention is more easily installed by hand than the form of Figs. 1 and 2. The disadvantage of the protector 20 is its use of metal loops, possibly subject to eventual rust or corrosion even though rust-proofed, and likely to tear loose from the ends of the protector unless the joints are carefully made.

Both forms hold the protector securely against shifting, and protect the principal parts of the bumper as well as portions of the bumper guards. The protectors may be pleasingly colored or decorated or may blend with the color of the bumper (in the case of military vehicles). They may be manufactured to sell at an attractive price and will give service for years, in many cases outlasting the vehicle itself. If rubber or rubber substitutes are scarce, the protectors may be made of elasticized Orlon, for example; Orlon being particularly desirable because it resists weathering better than almost any other textile fabric.

Obviously the invention is not limited to the embodiments herein shown and described but may assume other forms.

What I claim is:

1. In combination, an automotive bumper having at least two bumper guards and a protector for the bumper made of a readily stretchable and contractible fabric material forming an elongated body having sufficient dimensions to protect the principal part of the forward surface of the bumper, said fabric body being shorter than the forward surface of the bumper when in normal, unstretched condition and having apertures at its opposite ends providing loops engaging and fitting around the end portions of the bumper bar so that the protector, after being stretched to engage said apertures, is held upon the bumper by contraction, with each loop located between a bumper guard and the nearer end of the bumper, each loop being held in contact with the bumper guard by said contraction.

2. In combination, an automotive bumper with bumper guards fixed thereto and extending generally vertically and at right angles to the longitudinal axis of the bumper, and a protector made of stretchable cushioning resilient fabric material formed into an elongated body having sufficient width and length when stretched to lie forward of the principal part of the outer generally upright surface of the bumper and also to lie outside of said bumper guards, said protector including loop-like securing means at both ends, said loop-like securing means providing apertures through which the extremities of the bumper pass when the protector is installed on the bumper, the protector in installed position being contracted until said loop-like securing means are adjacent the respective bumper guards, which prevent further contraction of the protector body, the ends of the bumper then extending beyond the loop-like securing means.

References Cited in the file of this patent

UNITED STATES PATENTS

| | | |
|---|---|---|
| 1,566,839 | Denels | Dec. 22, 1925 |
| 1,884,392 | Treat | Oct. 25, 1932 |
| 1,978,769 | Stamand | Oct. 30, 1934 |
| 2,197,839 | Roberts et al. | Apr. 23, 1940 |
| 2,224,103 | Nilson | Dec. 3, 1940 |
| 2,271,046 | Sing | Jan. 27, 1942 |